United States Patent [19]

Behncke

[11] Patent Number: 4,928,293
[45] Date of Patent: May 22, 1990

[54] APPARATUS FOR STABILIZATION OF X-RAY FLUORESCENCE LAYER THICKNESS MEASURING INSTRUMENTS FOR STABILIZATION SNF PROCESS THEREOF

[76] Inventor: Hans H. Behncke, Gartenstr. 36, D-7400 Tubingen, Fed. Rep. of Germany

[21] Appl. No.: 100,164
[22] Filed: Sep. 23, 1987
[51] Int. Cl.$^5$ .................................. G01N 23/223
[52] U.S. Cl. ..................... 378/50; 378/48; 378/207
[58] Field of Search ............... 378/50, 89, 44, 207, 378/160, 48

[56] References Cited

U.S. PATENT DOCUMENTS 4,597,093 6/1986 Fischer ............................ 378/50

FOREIGN PATENT DOCUMENTS 0078307 5/1985 Japan ............................ 378/50
0127405 7/1985 Japan ............................ 378/50

Primary Examiner—Carolyn E. Fields
Assistant Examiner—David P. Porta

[57] ABSTRACT

An apparatus for stabilization of a proportional counting tube for a layer thickness measuring instrument according to the X-ray fluorescence principle. The instrument has an X-ray generator and a counting tube. The apparatus comprises a first closing device for X-rays lying downstream in terms of radiation and alongside the counting tube, and an operating device for bringing the first closing device at least into a closed position and an open position. A bypass passage leads from the counting tube to the X-rays, which is arranged to be open in the closed position of the first closing device. A second closing device is arranged in the bypass passage. The transmittance characteristic through the bypass passage is such that the counting rate of radiation arriving at the counting tube through the bypass passage is in the range of counting rates reflected by an object to be measured.

19 Claims, 2 Drawing Sheets

APPARATUS FOR STABILIZATION OF X-RAY FLUORESCENCE LAYER THICKNESS MEASURING INSTRUMENTS FOR STABILIZATION SNF PROCESS THEREOF

The invention relates to an apparatus for stabilization of a proportional counting tube for a layer thickness measuring instrument according to the X-ray fluorescence principle, which instrument has an X-ray generator and a counting tube. More particularly, the apparatus comprises a first closing device for X-rays lying downstream in terms of radiation and alongside the counting tube, and an operating device for bringing the first closing device at least into a closed position and an open position.

BACKGROUND OF THE INVENTION

Relevant prior art as claimed is based on an apparatus according to U.S. Pat. No. 4,597,093, which issued on June 24, 1986. There, a proportional counting tube 97 is shown. An X-ray generator 33 sends and X-ray beam to a target 92, which is excited to produce X-ray fluorescence and the excited radiation is radiated to the counting tube 97. A closing device 41 is drawn in the OPEN position. In order that no radiation can emerge from the opening 22 when the latter is open upward, the plug 41 can be turned by means of an operating device (not shown) in such a way that its bore hole 42 is horizontal. It is then in the CLOSED position.

The plug 41 can be imagined as the rotatable part of a beer faucet. It is clear, however, that the closing device does not have to be rotationally operable. Rather, it may also be translationally operable.

It is clear that such a measuring instrument—like any other—has a drift, induced by effects such as heat, age, power supply, etc. In order that an intensity measurement can be carried out with a certain characteristic X-radiation, it is necessary that the amplification of the "proportional counting tube—charge amplifier—main amplifier—multi—channel analyzer" system operates stably. A stabilization of this measuring system is achieved in the prior art in that a radiation with a defined spectrum is irradiated onto the counting tube and the entire measuring arrangement is stabilized such that the line of this spectrum always lies in a certain position. This is not possible during measuring. Usually, at certain periodic intervals, instead of an object to be measured (target), a reference object is brought into the primary ray. It is either introduced manually or swung in automatically and then the counting tube is stabilized. The disadvantage of this process is that the system is operated unstabilized between the individual stabilization phases.

It is typical of layer thickness measurement in the prior art that a break always occurs after short measuring time intervals (between 1 and 20 seconds), which break may extend to several minutes. In these breaks, a different object to be measured is positioned. For radiation protection safety reasons, the primary radiation then has to be screened off in the measuring room. Or there are small measuring tasks to be performed and the instrument is not operated, but remains switched on. In this case too, X-ray protection regulations specify that the radiation must not be emitted into the accessible measuring room. In order to meet the requirement for radiation protection, after completion of a measurement, the outlet opening of the primary X-ray is screened off by a closing device.

OBJECT AND STATEMENT OF THE INVENTION

The object of the invention is to make possible a stabilization in which no measuring time is lost and no active handling by the customer is intended, whether stabilization takes place or not.

According to the invention, this object is achieved by the following features:

Means define a bypass passage leading from the counting tube to at least the X-rays, which is arranged to be open in the closed position of the first closing device.

A second closing device is arranged in the bypass passage.

And means are provided for establishing a transmittance characteristic through the bypass passage such that the counting rate of radiation arriving at the counting tube through the bypass passage is in the range of counting rates reflected by an object to be measured.

This makes it possible for a stabilization to be carried out in the breaks which inevitably occur through use of the apparatus. No separate X-ray generator is necessary either. Furthermore, the necessary outlay is minimal.

Advantageously, the invention includes the following additional features:

The counting tube has a light metal jacket.

This makes it possible to supply the stabilization X-radiation to the counting tube at any position, for example where the path between the first closing device and the counting tube is shortest, since light metal is transparent to the X-rays. If counting tubes with steel jacket were to be used, either a special window for the stabilization radiation would have to be created, which could well be costly with the relatively small piece numbers, or else the window which is also used for the radiation coming from the object to be measured would have to be used for the stabilization radiation. This would, however, probably result in long paths.

The light metal is an aluminum alloy.

This makes it possible to use the most widespread counting tubes.

The bypass passage leads from the first closing device to the counting tube.

This makes it possible to use the movements of the first closing device at the same time to supply the X-ray for stabilization to the counting tube.

The means defining the bypass passage comprises absorbent material having coaxial stepped bore hole in which a first bore hole of smaller diameter than a coaxial bore in the stepped bore hole reduces the counting rate by a certain amount.

This means that it is not necessary to provide a thin bore hole over the entire length of the bypass passage. Rather, it is then possible to provide a relatively short first bore hole. This must be considered, bearing in mind that even a bore hole in the tenths of a millimeter range would send substantially more radiation to the counting tube than would correspond to the range of customary counting tubes, which comes from the objects to be measured.

The first bore hole lies upsteam in the stepped bore hole in terms of radiation.

This has the effect that the X-radiation is damped right at the beginning, so that the degree of X-radiation is on the less dangerous side right from the outset.

A thin layer of material lies in the bypass passage, which reduces the counting rate by a certain amount.

This makes it possible, by dimensioning of the thin layer, to reduce the counting rate to the desired value without the first bore hole having to be prohibitively thin. In addition, the thin layer can be selected in terms of material such that it absorbs certain radiations, such as, for example, I radiation, but allows through the desired k radiation.

The first and second closing devices are forcibly coupled.

This means that only the first closing device has to be operated and then the second closing device is correctly operated automatically.

The second closing device is arranged to allow X-rays to enter the bypass passage only when the first closing device is closed completely.

This prevents the counting tube receiving rays on two paths.

The bypass passage is arranged to open out onto the first closing device, and the first closing device is integral with the second closing device.

These features have the effect that the apparatus is small, the outlay is low and very little has to be modified on the first closing device to make it also into the second closing device.

The first closing device has a movable portion with a recess that communicates with both the bypass passage and the X-rays in the closed position of the first closing device.

This has the effect that the counting tube can be irradiated with rays directly or indirectly by those X-rays which are constantly in front of the first closing device. Thus, no second separate passage from the generator to the counting tube is needed. Rather, the existing passage can be utilized.

A metal X-radiation absorbing casing has a recess and a first continuous bore hole for X-radiation radiated from the generator to a target. The first closing device comprises a complementary plug rotatable about an axis of rotation and sealed against radiation in the recess. The plug has a second continuous bore hole which can be brought into an alignment position with the first continuous bore hole by the operating device and out of alignment into a hole-blocking position by the operating device, which is a substantial departure from the alignment position. And the plug recess has an area that in the blocking position sees the bypass passage and the generator and transmits stabilizing radiation to the counting tube.

These features make it possible to start from the known first closing devices and obtain the second closing device in a way which is cheap, simple and harmless in terms of radiation, and to send the rays from it into the bypass passage.

The area of the plug recess consists at least in part of material that when excited emits K radiation.

Such material is best suited if the rays are sent indirectly (not on a straight path) into the bypass passage.

The material has an order number of about 50.

This makes it possible to meet the requirement that the energy of the characteristic radiation is as high as possible. At higher order numbers, the k radiation would no longer be excited.

The material contains tin.

Such material is cheap and available everywhere. However, silver or the like could also be used, for example.

The material is soldering tin that is soldered onto the recess area.

This allows the area to be produced in a quite simple way, since soldering tin is available in any laboratory. Surprisingly, the soldering tin can simply be soldered onto the plugs presently consisting of steel.

The thin layer is of a material that allows K radiation to pass damped and substantially absorbs I radiation.

This makes it possible to absorb the I radiation of the lead. If there were both the k radiation of the tin and the I radiation of the lead, there would of course be two maximums. However, for the sake of unambiguity, only one is required for stabilization. Thus, the readily available soldering tin can continue to be used.

The thin layer is a non-ferrous metal foil.

A foil like this is excellently suitable. But it could also consist of steel or cobalt. Aluminum would have too low an order number and silver could not be used because it does not absorb the I radiation from the lead quite right.

The foil is a copper/beryllium foil.

This material provides access to the film which is widely produced industrially in all possible thicknesses.

The process for operation of an apparatus as described above comprises:

accumulating the counting rate as a measured value in a memory during measuring breaks, accumulating the individual periods of the measuring breaks up to a given period, and thereafter carrying out stabilization of the proportional counting tube automatically.

This process uses the measuring breaks for stabilization. The customer need not think about stabilization. No time is lost for stabilization. The instruments are always ready to measure, and stabilization can take place more frequently.

DESCRIPTION OF THE DRAWINGS

A preferred exemplary embodiment of the invention will now be described.

DETAILED DESCRIPTION

Figure 1:
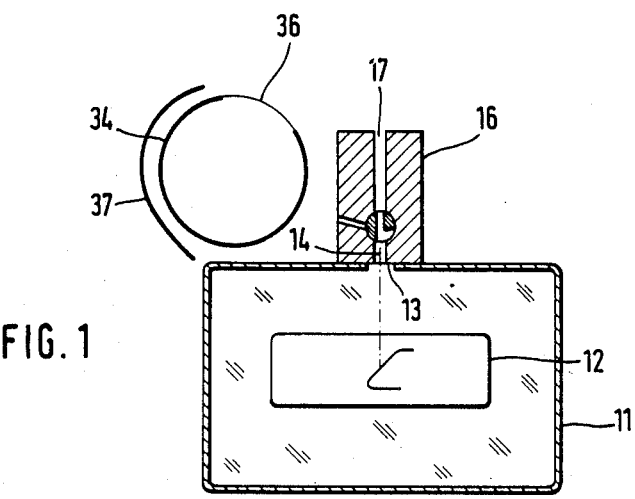
FIG. 1 shows a diagrammatic sectional arrangement.

According to FIG. 1, an X-ray generator 12 is provided in a radiation-sealed container 11. Above said generator, the container has a hole 13, through which an X-ray 14 can leave upwards. Above the hole 13 a metal structure 16 is provided, the material of which absorbs X-rays and which has a passage 17 pointing from bottom to top. In the lower region, directly above the hole 13, a circular-cylindrical recess 18 is provided in the structure 16, which recess is coaxial to a horizontal geometrical longitudinal axis 19. Seated in the recess 18 is a plug 21, which is likewise circular-cylindrical and co-axial to the geometrical longitudinal axis 19 and can be rotated by an operating device 22, drawn in broken lines in FIG. 2. This operating device 22 may be a positioning motor. The plug 21 has a diametrically running continuous bore hole 23, which is just smaller in cross-sectional dimension than the cross-sectional dimension of the passage 17. In the position drawn in FIG. 2, radiation can pass from bottom to top, which ultimately reaches the object to be measured (not shown), as shown for example by German Offenlegungsschrift 3,239,379.2.

Figure 2:
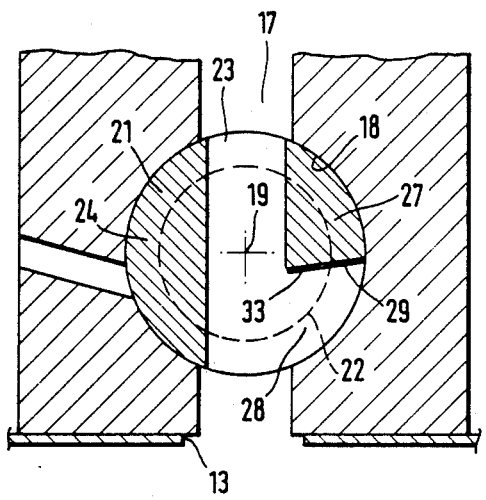
FIG. 2 shows a representation of the left-hand upper region in FIG. 1, as it is actually produced.
Figure 3:
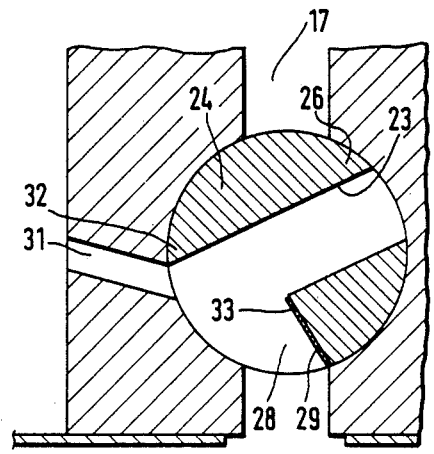
FIG. 3 shows a diagrammatic representation of the plug in the open position for rays to the object to be measured and in the closed position for rays in the bypass passage.

In the position drawn in FIG. 3, the upper part of the passage 17 is screened off by the sector 24, which has remained on the one side of the continuous bore hole 23 and, seen from the geometrical longitudinal axis 19, extends over approximately 140°. The continuous bore hole 23 is inclined at approximately 25°, in other words it is not drawn horizontally in FIG. 3 and nerverthless this rotation, which is not quite through 90° compared with FIG. 2, is sufficient to screen off, sealed against radiation, the upper part of the passage 17. The overlap in the corner region 26 of the plug 21 with the structure 16 is still large enough for the plug 21 not to be radiation-transparent in this corner region either. Of course, the plug 21 is also of radiation-absorbing material.

In the region of the continuous bore hole 23, a clearance 28 is made in the second sector 27 of the plug 21, which clearance extends on the one hand up to the periphery of the plug 21 and on the other hand up to the continuous bore hole 23. The clearance 21 reaches up to what is in FIG. 3 the lower end of the continuous bore hole 23 and allows an area 29 to be created which is flat, lies, broadly speaking, radially and otherwise lies in such a way that in FIG. 3 it acts similarly to a mirror for the radiation in the lower part of the passage 17 and consequently radiation can pass into a bypass passage 31. This is when, and only when, the sector 24 screens off the upper part of the passage 12.

As can be seen, in this position the area 29 terminates at the bottom left where the lower part of the passage 17 terminates. It can be seen in FIG. 3 that the clearance 28 is ineffective both for the passage 17 and for the bypass passage 31, because then the sector 24 lies in front of the bypass passage 31.

If the plug 21 is turned back from its position drawn in FIG. 3 into the position drawn in FIG. 2, the bypass passage 31 is already closed on account of the corner region 32 before the overlap of the corner region 26 with the structure 16 ceases. Thus, two closing devices have been combined in one.

Soldering tin 33 is applied on the area 29 and is excited in the position of FIG. 3, sending a part of its radiation into the bypass passage 31.

According to FIG. 1, the passage 17 can thus send radiation to the object to be measured (in the case of a plug position according to FIG. 2). The radiation emitted from the object to be measured can then be absorbed by the proportional counting tube, which has a window for this in the region 36. In order that no radiation can penetrate from the rear, usually a sector-shaped screen 37 is provided in the drawn region behind the counting tube.

In the plug position according to FIG. 3, the counting tube 34 can likewise be supplied radiation from obliquely below.

Figure 4:
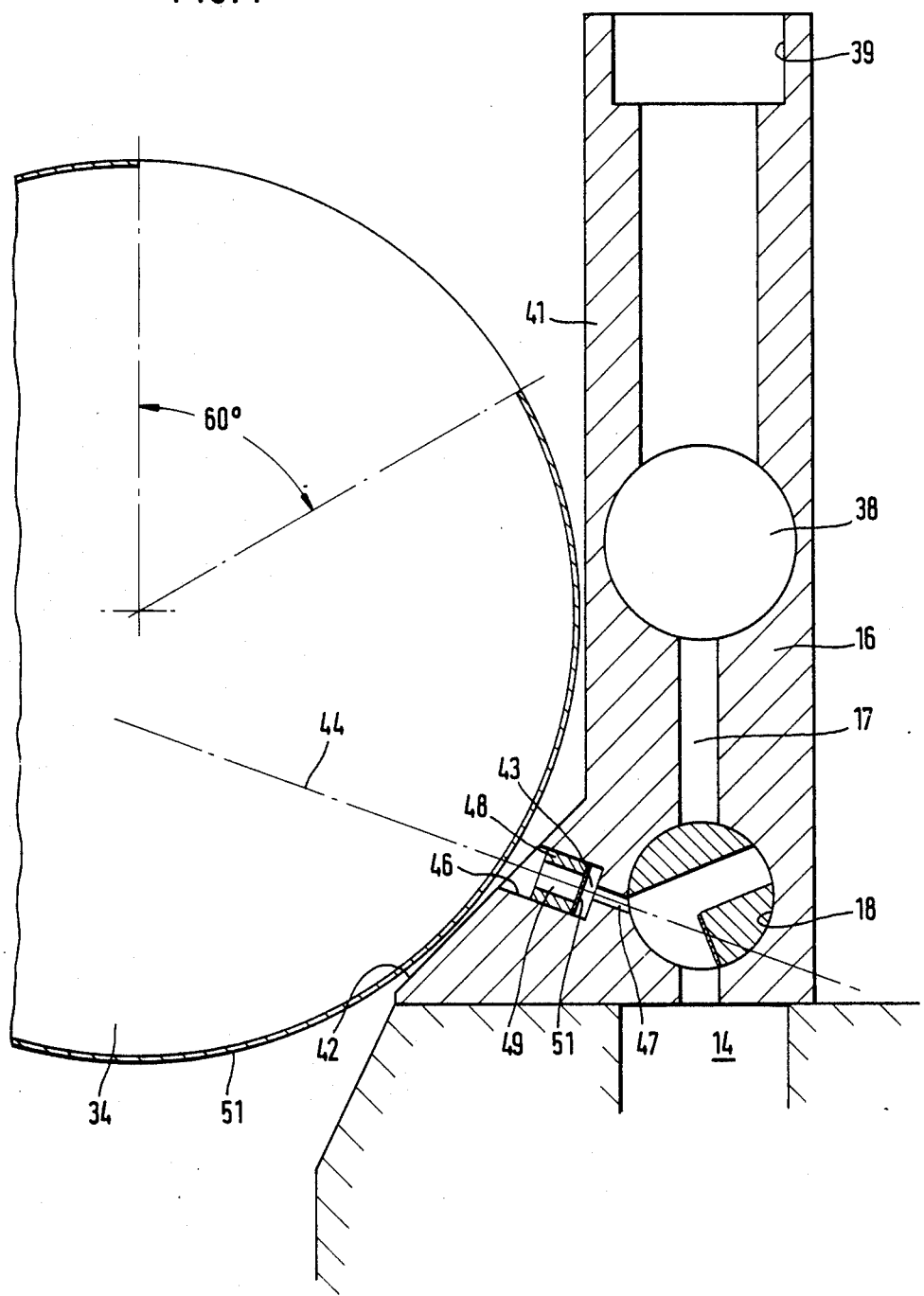
FIG. 4 shows a representation like FIG. 3, but in closed position for the measuring rays to the object to be measured and open position for the rays in the bypass passage.

FIG. 4 shows more precise realization. The counting tube 34 can be seen there. The region 36 extends over the angle drawn of 60°. The structure 16 and the passage 17 can be seen. Further above is provided the space 38 for a known mirror (not shown) and the collimator from the prior art can be accommodated in a guide 39.

The left-hand region of the structure 14 according to FIG. 4 is such that the counting tube 34 can fit snugly into the perpendicular wall 41 and into the wall 42 inclined downward to the left from there at approximately 45°. The actual execution of the bypass passage 31 can also be seen. It is designed as a stepped bore hole 43 and consequently has two bore holes 46, 47, coaxial to a geometrical longitudinal axis 44. The bore hole 47, of substantially smaller diameter, has a diameter of 0.15 mm, in other words is drawn exaggeratedly thick. It opens out into the bore hole 46, which is not drawn exaggeratedly thick, and begins in the recess 18 at approximately 9 o'clock.

In the bore hole 46 there is a coaxial sleeve 48, which fits precisely into the bore hole 46. This sleeve 48 itself has a coaxial longitudinal bore hole 49. The latter serves as the support for a copper-beryllium foil 51, which is adhesively fixed to its inner face.

In the approximate place where the geometrical longitudinal axis 44 penetrates the counting tube 34, k radiation enters through the aluminum jacket 51 of the latter at such a counting rate as also passes in the average of cases through the region 36 into the counting tube 34.

In operation of the apparatus, radiation is sent into the counting tube 34 in the measuring breaks, which coincides with the position of the plug 21 according to FIG. 3. These times are added in a memory. If a sufficiently long time has elapsed, the counting rate which has in the meantime passed into the counting tube 34 in the position according to FIG. 3 is used for stabilization: the amplification of the proportional counting tube, charge amplifier (not shown), main amplifier (not shown), multi-channel analyzer (not shown) system is regulated.

What is claimed is:

1. Apparatus for stabilization of a proportional counting tube for a layer thickness measuring instrument according to the X-ray fluorescence principle, said instrument having an X-ray generator and a counting tube, said apparatus comprising:
a first closing device for X-rays laying downstream in terms of radiation and alongside said counting tube,
an operating device for bringing said first closing device at least into a closed position and an open position,
and the improvement wherein:
means define a bypass passage leading from said counting tube to at least said X-rays, which is arranged to be open in said closed position of said first closing device,
a second closing device is arranged in said bypass passage, said second closing device being arranged to allow X-rays to enter said bypass passage only when said first closing device is closed completely, and
means are provided for establishing a damping transmittance characteristic through said bypass passage such that the counting rate of radiation arriving at said counting tube through said bypass passage is in the range of counting rates reflected by an object to be measured.

2. An apparatus according to claim 1, wherein said counting tube has a light metal jacket.

3. An apparatus according to claim 2, wherein said light metal is an aluminum alloy.

4. An apparatus according to claim 1, wherein said bypass passage leads from said first closing device to said counting tube.

5. An apparatus according to claim 1, wherein a layer of material lies in said bypass passage that establishes said damping transmittance characteristics at least in part by reducing said counting rate by a certain amount.

6. An apparatus according to claim 5, wherein said layer is of a material that allows K radiation to pass damped and substantially absorbs I radiation.

7. An apparatus according to claim 6, wherein said layer is a non-ferrous metal foil.

8. An apparatus according to claim 7, wherein said foil is a copper/beryllium foil.

9. An apparatus according to claim 1, wherein said first and second closing devices are forcibly coupled.

10. An apparatus according to claim 1, wherein said bypass passage is arranged to open out onto said first closing device and said first closing device is integral with said second closing device.

11. An apparatus according to claim 10, wherein said first closing device has a movable portion with a recess that communicates with both said bypass passage and said X-rays in said closed position of said first closing device.

12. An apparatus according to claim 11, comprising a metal x-radiation absorbing casing having a recess and a first continuous bore hole for X-radiation radiated from said generator to a target, said first closing device comprising a complementary plug rotatable about an axis of rotation and sealed against radiation in said recess, said plug having a second continuous bore hole which can be brought into an alignment position with said first continuous bore hole by said operating device and out of alignment into a hole-blocking position by said operating device, which is a substantial departure from said alignment position, said plug recess having an area that in said blocking position sees said bypass passage and said generator and transmits stabilizing radiation to said counting tube.

13. An apparatus according to claim 12, wherein said area of said plug recess consists at least in part of material that when excited emits K radiation.

14. An apparatus according to claim 13, wherein said material has an order number of about 50.

15. An apparatus according to claim 13, wherein said material contains tin.

16. An apparatus according to claim 13, wherein said material is soldering tin that is soldered onto said recess area.

17. Process for operation of an aparatus for stabilization of a proportional counting tube for a layer thickness measuring instrument according to the X-ray fluorescence principle, in which a first closing device for X-rays is brought into a closed position and an open position, a bypass passage leads from said counting tube to said X-rays and is open to said X-rays in said closed position of said first closing device, a second closing device is in said bypass passage, said second closing device is arranged to allow X-rays to enter said bypass passage only when said first closing device is closed completely, and the damping transmittance characteristic through said bypass passage is such that the counting rate of radiation arriving at said counting tube through said bypass passage is in the range of counting rates reflected by an object to be measured, comprising:
   accumulating said counting rate as a measured value in a memory during measuring breaks,
   accumulating the individual periods of said measuring breaks up to a given period, and
   thereafter carrying out stabilization of said proportional counting tube automatically.

18. Apparatus for stabilization of a proportional counting tube for a layer thickness measuring instrument according to the X-ray fluorescence principle, said instrument having an X-ray generator and a counting tube,
   said apparatus comprising:
   a first closing device for X-rays lying downstream in terms of radiation and alongside said counting tube,
   an operating device for bringing said first closing device at least into a closed position and an open position,
   and the improvement wherein:
   means define a bypass passage leading from said counting tube to at least said X-rays, which is arranged to be open in said closed position of said first closing device,
   the means defining said bypass passage comprises absorbent material having a coaxial stepped bore hole in which a first bore hole of smaller diameter than a coaxial bore in said stepped bore hole reduces said counting rate by a certain amount,
   a second closing device is arranged in said bypass passage and
   means are provided for establishing a transmittance characteristic through said bypass passage such that the counting rate of radiation arriving at said counting tube through said bypass passage is in the range of counting rates reflected by an object to be measured.

19. An apparatus according to claim 18, wherein said first bore hole lies upstream in said stepped bore hole in terms of radiation.

* * * * *

UNITED STATES PATENT AND TRADEMARK OFFICE
CERTIFICATE OF CORRECTION

PATENT NO. : 4,928,293

DATED : May 22, 1990

INVENTOR(S) : Hans H. Behncke

It is certified that error appears in the above-identified patent and that said Letters Patent is hereby corrected as shown below:

Title page at [54], Column 1 at the beginning, change the title to --

Apparatus For Stabilization For X-Ray Fluorescence Layer Thickness Measuring

Instruments and Process Therefor --

Signed and Sealed this

Ninth Day of July, 1991

*Attest:*

HARRY F. MANBECK, JR.

*Attesting Officer*

*Commissioner of Patents and Trademarks*